(12) United States Patent
McGlashan et al.

(10) Patent No.: US 8,924,385 B2
(45) Date of Patent: Dec. 30, 2014

(54) QUERY-BASED DIAGRAMMATIC PRESENTATION OF DATA

(75) Inventors: Blair Stuart McGlashan, Biggleswade (GB); J. Duncan C. Pocklington, Huntingdon (GB); Jean-Marc Prieur, Ollioules (FR); Stuart John Harding Kent, Canterbury (GB); Eyal Lantzman, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 295 days.

(21) Appl. No.: 13/084,911

(22) Filed: Apr. 12, 2011

(65) Prior Publication Data

US 2012/0265773 A1   Oct. 18, 2012

(51) Int. Cl.
*G06F 17/30*   (2006.01)

(52) U.S. Cl.
CPC ............................... *G06F 17/30398* (2013.01)
USPC ............ 707/736; 707/737; 707/754; 707/798

(58) Field of Classification Search
USPC .................................. 707/754, 736–737, 798
See application file for complete search history.

(56) References Cited

U.S. PATENT DOCUMENTS

| | | | |
|---|---|---|---|
| 5,448,737 A | | 9/1995 | Burke et al. |
| 5,471,611 A | | 11/1995 | McGregor |
| 5,689,711 A | | 11/1997 | Bardasz et al. |
| 6,154,213 A | * | 11/2000 | Rennison et al. ............. 715/854 |
| 6,199,199 B1 | | 3/2001 | Johnston et al. |
| 6,226,630 B1 | * | 5/2001 | Billmers ................................ 1/1 |
| 6,557,011 B1 | | 4/2003 | Sevitsky et al. |
| 6,571,233 B2 | * | 5/2003 | Beavin et al. .................. 707/713 |
| 7,174,536 B1 | | 2/2007 | Kothari et al. |
| 7,308,457 B1 | * | 12/2007 | Sundman et al. ...................... 1/1 |
| 7,383,513 B2 | * | 6/2008 | Goldberg et al. ............. 715/763 |
| 7,472,359 B2 | | 12/2008 | Ciesielski et al. |
| 7,624,349 B2 | | 11/2009 | Seemann et al. |
| 7,627,861 B2 | | 12/2009 | Smith et al. |
| 7,657,516 B2 | * | 2/2010 | Zaman et al. .......... 707/999.004 |
| 7,681,176 B2 | | 3/2010 | Wills et al. |
| 7,774,700 B2 | | 8/2010 | Novoselsky |
| 7,774,746 B2 | * | 8/2010 | Mansfield et al. ............ 717/106 |
| 7,814,427 B2 | | 10/2010 | Cook et al. |
| 8,091,074 B2 | | 1/2012 | Lyon-Smith |
| 8,312,039 B2 | * | 11/2012 | Gilula ........................... 707/769 |
| 8,674,993 B1 | * | 3/2014 | Fleming et al. ............... 345/440 |

(Continued)

OTHER PUBLICATIONS

Young, Peter, "Three Dimensional Information Visualisation", Retrieved at<<http://citeseerx.ist.psu.edu/viewdoc/download-?doi=10.1.1.54.3719&rep=rep1&type=pdf>>, Nov. 1, 1996, pp. 1-31.

(Continued)

*Primary Examiner* — Hanh Thai (57) ABSTRACT

A method for providing a query-based diagrammatic presentation of data includes generating a filter element that defines a set of groups and includes a set of declarative queries that define information to be included in the set of groups. The filter element is applied to a data source, which includes performing the set of declarative queries on the data source, thereby generating a set of query results for each of the groups. A diagram is generated that includes a set of shapes representing the set of groups, and a set of nodes nested within each of the shapes, wherein the nodes for each group are determined based on the query results for that group.

20 Claims, 6 Drawing Sheets

(56) References Cited

U.S. PATENT DOCUMENTS

| | | | |
|---|---|---|---|
| 2002/0083049 A1* | 6/2002 | Forster et al. | 707/3 |
| 2002/0103558 A1 | 8/2002 | Iwamasa | |
| 2004/0073546 A1* | 4/2004 | Forster et al. | 707/4 |
| 2004/0133555 A1* | 7/2004 | Toong et al. | 707/2 |
| 2004/0252121 A1* | 12/2004 | Bhatt et al. | 345/440 |
| 2005/0120027 A1* | 6/2005 | Ter Horst | 707/100 |
| 2005/0138160 A1* | 6/2005 | Klein et al. | 709/223 |
| 2006/0101005 A1* | 5/2006 | Yang et al. | 707/3 |
| 2006/0150169 A1 | 7/2006 | Cook et al. | |
| 2006/0200799 A1 | 9/2006 | Wills et al. | |
| 2007/0103984 A1* | 5/2007 | Kavuri et al. | 365/185.17 |
| 2007/0136788 A1* | 6/2007 | Monahan et al. | 726/3 |
| 2007/0174254 A1* | 7/2007 | Toong et al. | 707/3 |
| 2007/0222783 A1 | 9/2007 | Seemann et al. | |
| 2007/0233655 A1 | 10/2007 | Engels | |
| 2008/0010597 A1 | 1/2008 | Seemann et al. | |
| 2008/0033777 A1* | 2/2008 | Shukoor | 705/8 |
| 2009/0182636 A1* | 7/2009 | Gilula | 705/14 |
| 2009/0216728 A1* | 8/2009 | Brainerd et al. | 707/3 |
| 2009/0278848 A1* | 11/2009 | Robertson et al. | 345/440.2 |
| 2010/0030725 A1* | 2/2010 | Mendis et al. | 707/1 |
| 2010/0088669 A1 | 4/2010 | Cwalina et al. | |
| 2010/0281166 A1* | 11/2010 | Buyya et al. | 709/226 |
| 2010/0325620 A1 | 12/2010 | Rohde et al. | |
| 2010/0332475 A1* | 12/2010 | Birdwell et al. | 707/737 |
| 2011/0179370 A1* | 7/2011 | Cardno et al. | 715/771 |
| 2011/0261049 A1* | 10/2011 | Cardno et al. | 345/419 |
| 2012/0192151 A1 | 7/2012 | Parkes et al. | |

OTHER PUBLICATIONS

Shao, et al., "Wise: a Workflow Information Search Engine", Retrieved at<<http://www.public.asu.edu/~qshao1/doc/icde09_wise.pdf>>, IEEE International Conference on Data Engineering, 2009, pp. 1491-1494.

Stonebraker, Michael, "Visionary Tech Whitepaper",Retrieved at<< http://www.rocketsoftware.com/products/visionary/resources/white-papers/visionary-tech-whitepaper.pdf>>, 2003, pp. 1-13.

"International Search Report & Written Opinion for PCT Application No. PCT/US2013/049111", Mailed Date: Mar. 6, 2014, Filed Date: Jul. 2, 2013, 19 Pages.

Reniers, et al., "A Visual Analytics Toolset for Proaram Structure, Metrics, and Evolution Comprehension", In Proceedings of WASDeTT3, Aug. 2010, pp. 1-14.

Telea, et al., "Architecting an Open System for Querying Large C and C++ Code Bases", In South African Journal of Computing, vol. 41, Jan. 1, 2008, pp. 1-16.

Guckenheimer, et al., "Agile Software Engineering with Visual Studio: From Concept to Continuous Feedback (2nd Edition)", A Microsoft Windows Development Series, Sep. 23, 2011, pp. 1-321.

De Lucia, et al., "Design pattern recovery through visual language parsing and source code analysis", Retrieved at <<http://www.dmi.unisa.it/people/deufemia/www/Papers/DeLucia-et-al-JSS2009.pdf>>, Journal of Systems and Software, Feb. 20, 2009, pp. 1177-1193.

Babu, et al., "A Heuristic Approach for Selection of Software Architecture Using Functional Key Areas and Visualization Tools Integrated with DArch". Retrieved at <<http://paper.ijcsns.org/07_book/200906/20090636.pdf>>, Proceedings of IJCSNS, vol. 9 No. 6, Jun. 2009, pp. 248-254.

Telea, et al., "SOLIDFX: An Integrted Revese Engineering Environment for C++", Retrieved at <<http://ieeexplore.ieee.org/stamp/stamp.jsp?tp=&arnumber=4493339>>, Proceedings of CSMR, Apr. 1, 2008, pp. 320-322.

"Layer Diagrams: Guidelines," Visual Studio 2010, URL: http://msdn.microsoft.com/en-us/library/dd418995, 12 pages.

"Layer Diagrams: Reference, " Visual Studio 2010, URL: http://msdn.microsoft.com/en-us/library/dd409462, 4 pages.

* cited by examiner

QUERY-BASED DIAGRAMMATIC PRESENTATION OF DATA

BACKGROUND

One common application that computing technology supports are graphical modeling tools (also called "graphical designers"). Graphical modeling tools facilitate the orderly and efficient construction of graphical models. Graphical models include the visual representation of a collection of interrelated objects. Graphical models may be used in a different way by a wide variety of domains. For instance, workflows, organization charts, electrical circuits, software architectures, software flowcharts, may each be represented using graphical models. There may be literally thousands of different applications in which graphical modeling tools may be useful. In each case, the types of objects and interrelationships may be quite different. Even within a single domain of application, there may be definite preferences on how the objects and interrelationships are displayed. For instance, one bank may prefer one graphical modeling style for representing economic transactions, while another bank may represent a different graphical modeling style for economic transactions.

Building graphical modeling tools is a challenging and time consuming task. The building of a typical graphical designer may involve a software developer implementing a design surface that implements the graphical notation, a toolbox that allows the user to drag and drop elements onto the design surface, a mechanism for representing properties of the objects on the design surface—the properties representing meaningful information about the problem the user is trying to model, and other User Interface (UI) elements to navigate through the model data.

One application for a graphical modeling tool is to help a user understand the operation of a computer program. Maintaining and understanding programs can be challenging. Large programs may have millions of lines of code that implement thousands of objects that interact with each other. Making changes to the code without properly understanding this interaction may cause the code to function in unintended ways. In response, companies have created graphical modeling tools that generate graphical representations of interactions within a program. Unfortunately, these tools often do not give a good understanding of the program and are limited in flexibility.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

A problem addressed herein is to provide a more flexible graphical modeling tool that provides the ability for a user to choose how to filter and organize the information in terms of groups of nodes and links between them, maintain these choices in a query-based file, rehydrate a diagram from this query-based information, and refresh the diagram to reflect changes in the underlying data, while preserving the user's choices.

One embodiment is directed to a method for providing a query-based diagrammatic presentation of data. The method includes generating a filter element that defines a set of groups and includes a set of declarative queries that define information to be included in the set of groups. The filter element is applied to a data source, which includes performing the set of declarative queries on the data source, thereby generating a set of query results for each of the groups. A diagram is generated that includes a set of shapes representing the set of groups, and a set of nodes nested within each of the shapes, wherein the nodes for each group are determined based on the query results for that group.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

In a system where one is trying to present information in a data model as a nested graph, one embodiment provides the ability for a user to choose how to filter and organize the information in terms of groups of nodes and links between them. One embodiment maintains these choices in a query-based file, rehydrates a diagram from this query-based information, and refreshes the diagram to reflect changes in the underlying data, while preserving the user's choices. The system according to one embodiment includes algorithms that turn data to be presented into a nested graph of groups and nodes, and queries that define the information to be shown within the groups, where the queries can be recalculated when the data being presented changes. In one embodiment, the system includes a mechanism for defining the contents of groups as queries to produced a structured diagrammatic presentation of data, and provides the ability to preserve queries to capture content choices made by the user (e.g. in XML, text language, or code such as C# code). The system according to one embodiment uses the queries combined with an auto-layout system to rehydrate diagrams from scratch, or refresh the contents of a diagram that has preserved specific layout and formatting choices. The techniques described herein are applied in one embodiment to the construction of rich diagram visualizing software systems.

One embodiment includes a method for traversing the natural structure of the data and creating groups in a diagram reflecting natural groupings in the data and for introducing additional virtual or logical groupings. The structure and content of the diagrams generated according to one embodiment are described by a data model traversal implemented by a mediating layer, by declarative queries that refine the included content from that traversed, and by groupings a user chooses to create. Natural groupings in the data model are typically represented in the rendered diagram graph, but the user may also introduce additional virtual or logical groupings that are absent from the data model, where these logical groupings can be helpful to creating an understandable structured visualization of the entire data model. In one embodiment, the diagrams can be entirely rehydrated from a definition of the logical groupings plus the declarative queries, which may themselves be grouped into named sets for sharing and reuse amongst diagrams. A user interface is provided for editing all of this information for the diagrams.

Figure 1:
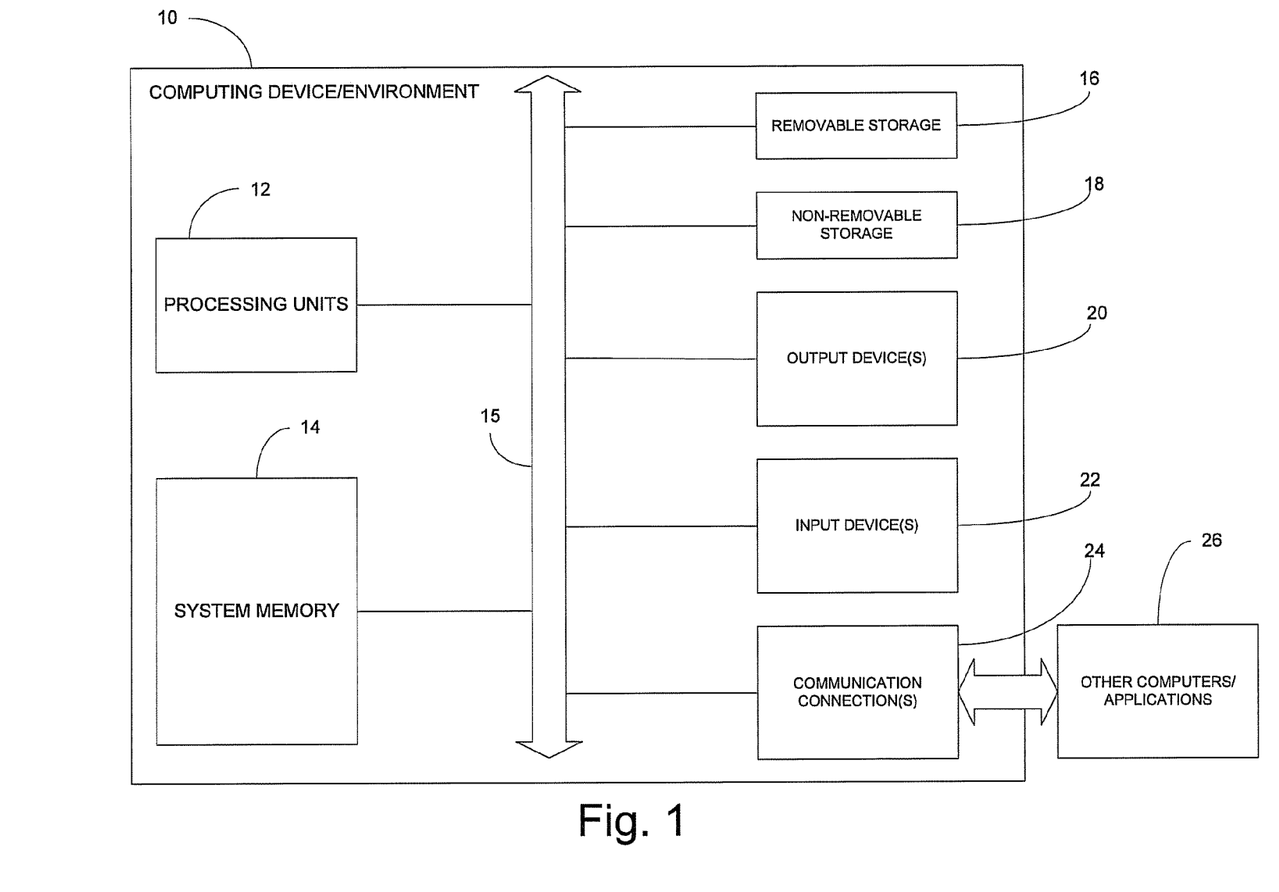
FIG. 1 is a diagram illustrating a computing environment suitable for implementing aspects of a system for providing a query-based diagrammatic presentation of data according to one embodiment.

FIG. 1 is a diagram illustrating a computing environment 10 suitable for implementing aspects of a system for providing a query-based diagrammatic presentation of data according to one embodiment. In the illustrated embodiment, the computing system or computing device 10 includes one or more processing units 12 and system memory 14. Depending on the exact configuration and type of computing device, memory 14 may be volatile (such as RAM), non-volatile (such as ROM, flash memory, etc.), or some combination of the two.

Computing device 10 may also have additional features/functionality. For example, computing device 10 may also include additional storage (removable and/or non-removable) including, but not limited to, magnetic or optical disks or tape. Such additional storage is illustrated in FIG. 1 by removable storage 16 and non-removable storage 18. Computer storage media includes volatile and nonvolatile, removable and non-removable media implemented in any suitable method or technology for storage of information such as computer readable instructions, data structures, program modules or other data. Memory 14, removable storage 16 and non-removable storage 18 are all examples of computer storage media (e.g., computer-readable storage media storing computer-executable instructions that when executed by at least one processor cause the at least one processor to perform a method). Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by computing device 10. Any such computer storage media may be part of computing device 10.

The various elements of computing device 10 are communicatively coupled together via one or more communication links 15. Computing device 10 also includes one or more communication connections 24 that allow computing device 10 to communicate with other computers/applications 26. Computing device 10 may also include input device(s) 22, such as keyboard, pointing device (e.g., mouse), pen, voice input device, touch input device, etc. Computing device 10 may also include output device(s) 20, such as a display, speakers, printer, etc.

FIG. 1 and the above discussion are intended to provide a brief general description of a suitable computing environment in which one or more embodiments may be implemented. It should be understood, however, that handheld, portable, and other computing devices of all kinds are contemplated for use. While a general purpose computer is described above, this is but one example, and embodiments may be implemented using only a thin client having network server interoperability and interaction. Thus, embodiments be implemented in an environment of networked hosted services in which very little or minimal client resources are implicated, e.g., a networked environment in which the client device serves as a browser or interface to the World Wide Web.

FIG. 1 thus illustrates an example of a suitable computing system environment 10 in which the embodiments may be implemented, although as made clear above, the computing system environment 10 is only one example of a suitable computing environment and is not intended to suggest any limitation as to the scope of use or functionality of the embodiments. Neither should the computing environment 10 be interpreted as having any dependency or requirement relating to any one or combination of components illustrated in the exemplary operating environment 10.

Figure 2:
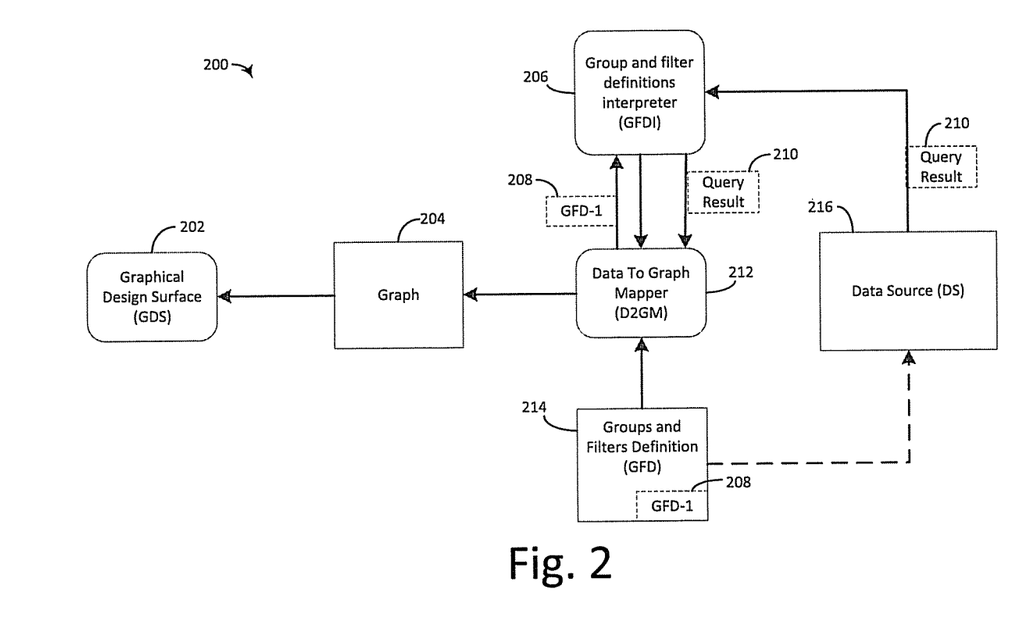
FIG. 2 is a block diagram illustrating a system for providing a query-based diagrammatic presentation of data according to one embodiment.

FIG. 2 is a block diagram illustrating a system 200 for providing a query-based diagrammatic presentation of data according to one embodiment. System 200 includes graphical design surface (GDS) 202, graph 204, group and filter definitions interpreter (GFDI) 206, data-to-graph mapper (D2GM) 212, groups and filters definitions (GFD) 214, and data source (DS) 216 (e.g., a database of abstract syntax trees (ASTs) for object oriented code, such as C# code). The solid arrows in FIG. 2 represent data flows, and the dashed arrows represent references. The rounded rectangles in FIG. 2 represent software components, and the squared rectangles represent specific instances of data, which may resident in memory, as files on disk, or in some data store that is local or behind a service in the cloud.

The D2GM 212 takes as input the GFD 214, which is expressed in some appropriate language (e.g., XML or C# code), and which includes queries that reference the data source 216. The D2GM 212 passes a version of the GFD 214 (i.e., GFD-1 208) to the GFDI 206, which returns to the D2GM 212 information about the structure of the GFD-1 208 (e.g., which groups are nested within other groups). The D2GM 212 walks down the structure of the GFD-1 208 provided by the GFDI 206, creating nodes in the graph 204 for each group and each group member. The nodes corresponding to the group members are nested inside the node corresponding to a group.

Queries defined in the GFD-1 208 are run against the data source 216 by the GFDI 206 on request from the D2GM 212, to determine the members of each group. Where a group X nests further groups in its definition, a node Y is created for each nested group for each member M of group X, and node Y is then nested inside the node corresponding to member M. Rules about link creation are also applied, with all possible links to nodes in the graph 204 being created if no rule is stated. Multiple passes may be performed (e.g., one pass to create nodes, then one pass to create links) to ensure that nodes are present before links are created. This continues until there are no more groups to process.

Once the graph 204 is created, it may be visualized on graphical design surface 202, using appropriate concrete rendering expressed in a language such as Windows Presentation Foundation (WPF). In one embodiment, group nodes are rendered as compartments inside another shape, and subnodes are shown as lists of items in that compartment.

As mentioned above, one way to implement the GFD 214 is to use a declarative language, such as using an eXtensible Markup Language (XML) document. However, the GFD 214 may also be represented in binary or other non-text forms as well.

Figure 3:
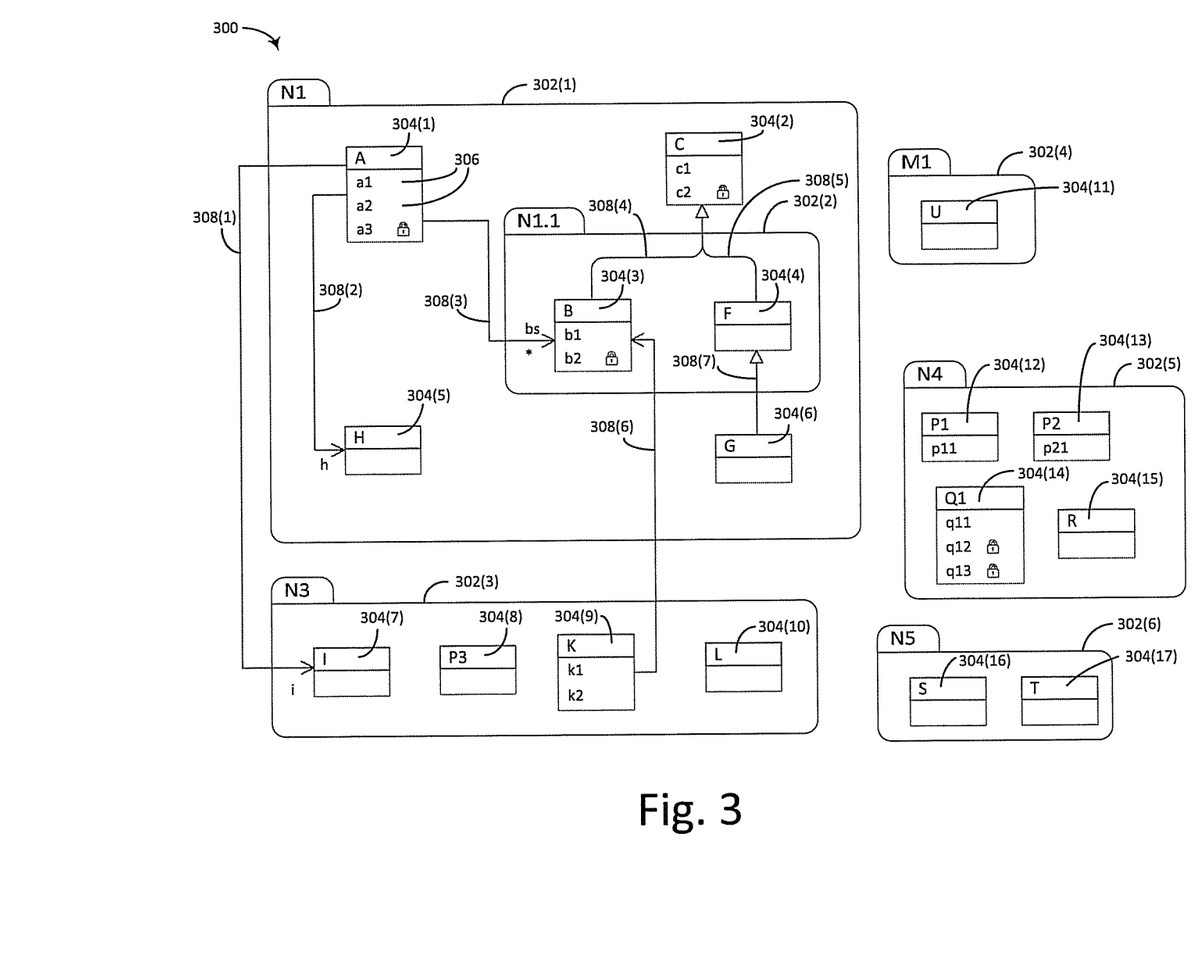
FIG. 3 is a diagram illustrating a nested graph with natural groupings prior to query-based filtering by the system shown in FIG. 2 according to one embodiment.

FIG. 3 is a diagram illustrating a nested graph 300 with natural groupings prior to query-based filtering by the system 200 shown in FIG. 2 according to one embodiment. Graph 300 is one example of a graph 204 (FIG. 2) that can be generated by system 200. Graph 300 includes groups 302(1)-302(6) (collectively referred to as groups 302), nodes 304(1)-304(17) (collectively referred to as nodes 304) nested within the groups 302, members 306 within the nodes 304, and links 308(1)-308(7) (collectively referred to as links 308) interconnecting some of the nodes 304.

The groups 302 include the identifiers N1, N1.1, N3, N4, N5 and M1, which represent namespaces. In the illustrated example, data source 216 (FIG. 2) is an abstract syntax tree for a set of object oriented code, and the groups 302 represent namespaces for that code. Nested within the groups 302 are nodes 304. The nodes 304 include the identifiers A, B, C, F, G, H, I, K, L, P1, P2, P3, Q1, R, S, T, and U, which represent classes within the namespaces. Each node 304 has a set of members 306 (e.g., methods, properties, and fields) defined in the class (at least those that are not shown as associations). The members 306 can include public members and private members. Private members are identified by a padlock symbol in the Figures. For example, node 304(1) includes two public members 306 (i.e., members a1 and a2) and one private member 306 (i.e., member a3).

Two kinds of relationships between classes are shown as links 308 between nodes 304 representing the classes: (1) inheritance links 308(4), 308(5), and 308(7) representing inheritance (e.g., class F inherits from class C); and (2) association links 308(1), 308(2), 308(3), and 308(6), representing properties whose type is another class or collection over another class, (e.g. class A is associated with class B, because class A has a property IEnumerable<B>bs). Collection types are indicated with a "*" annotation on the link 308, such as that shown for link 308(3).

Although the graph shown in FIG. 3 represents underlying code, this is just one example of the type of data that can be represented by the techniques described herein. The techniques described herein may be applied to nested graph visualizations of any kind of data.

Figure 4:
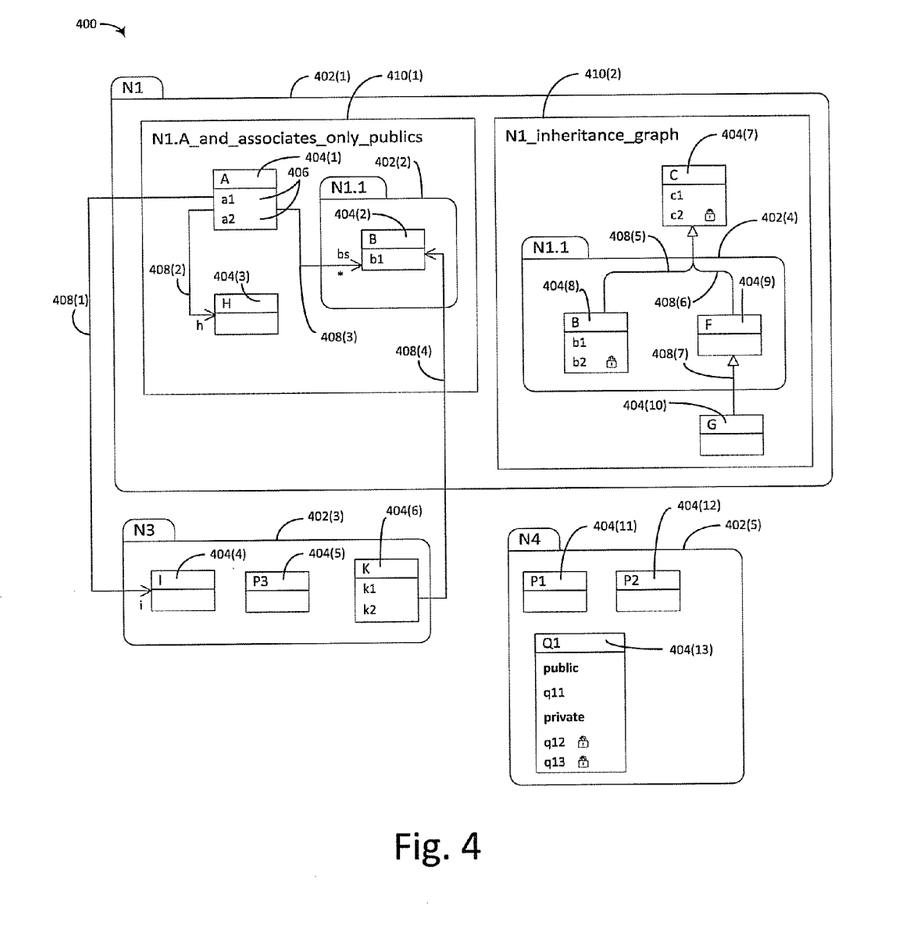
FIG. 4 is a diagram illustrating the nested graph shown in FIG. 3 after query-based filtering by the system shown in FIG. 2 according to one embodiment.

In the embodiment shown in FIG. 3, no filtering or reorganization of the data has occurred. All of the data is presented according to some specification of how it should be visualized "naturally," with no query-based filtering or reorganization of the presentation applied. FIG. 4 is a diagram illustrating the nested graph shown in FIG. 3 after query-based filtering and reorganization by the system 200 shown in FIG. 2 according to one embodiment.

Graph 400 includes groups 402(1)-402(5) (collectively referred to as groups 402), nodes 404(1)-404(13) (collectively referred to as nodes 404) nested within the groups 402, members 406 within the nodes 404, links 408(1)-408(7) (collectively referred to as links 408) interconnecting some of the nodes 404, and subgroups 410(1) and 410(2) (collectively referred to as subgroups 410) within group 402(1). Subgroup 410(1) is entitled "N1.A_and_associates_only_publics", and subgroup 410(2) is entitled "N1_inheritance_graph".

The groups 402 include the identifiers N1, N1.1, N3, and N4, which represent namespaces. Within the groups 402 are nodes 404. The nodes 404 include the identifiers A, B, C, F, G, H, I, K, P1, P2, P3, and Q1, which represent classes within the namespaces. Each node 404 has a set of members 406 (e.g., methods, properties, and fields) defined in the class (at least those that are not shown as associations).

The presentation of the classes in namespace N1 (i.e., group 402(1)) has been reorganized in FIG. 4 into two separate subgroups 410(1) and 410(2), where subgroup 410(2) shows an inheritance graph for namespace N1, and subgroup 410(1) shows association links centered on the class A (i.e., node 404(1)). Namespace M1 (i.e., node 302(4) in FIG. 3) and namespace N5 (i.e., node 302(6) in FIG. 3) have been left out of FIG. 4, and not all of the classes are shown in namespaces N3 and N4 (i.e., nodes 402(3) and 402(5)), according to some rules which will be described below. Rules have been applied in different parts of the diagram to determine which members get shown in which classes and whether or not they are grouped (e.g., in class Q1 (node 404(13) in FIG. 4) the members are grouped between public and private partitions). As another example, only the public members 406 of the nodes 404 within subgroup 410(1) are shown in FIG. 4 (i.e., the private members of the corresponding nodes shown in FIG. 3 have been filtered out).

One problem solved herein is how to specify the definition of the content of diagrams, such as that shown in FIG. 4, so that the contents of the diagram can be recalculated when the data it represents changes. A simplistic solution would be to explicitly enumerate all of the contents. However, that approach does not provide very much flexibility. For example, if the code was changed so that class H inherited from class B, then on refresh one would expect the diagram shown in FIG. 4 to be updated to include class H in the N1_inheritance_graph subgroup 410(2). A technique that simply enumerates all of the contents may not produce such a result. However, applying the techniques described herein, making such a change in the code results in a refreshed diagram, such as that shown in FIG. 5.

Figure 5:
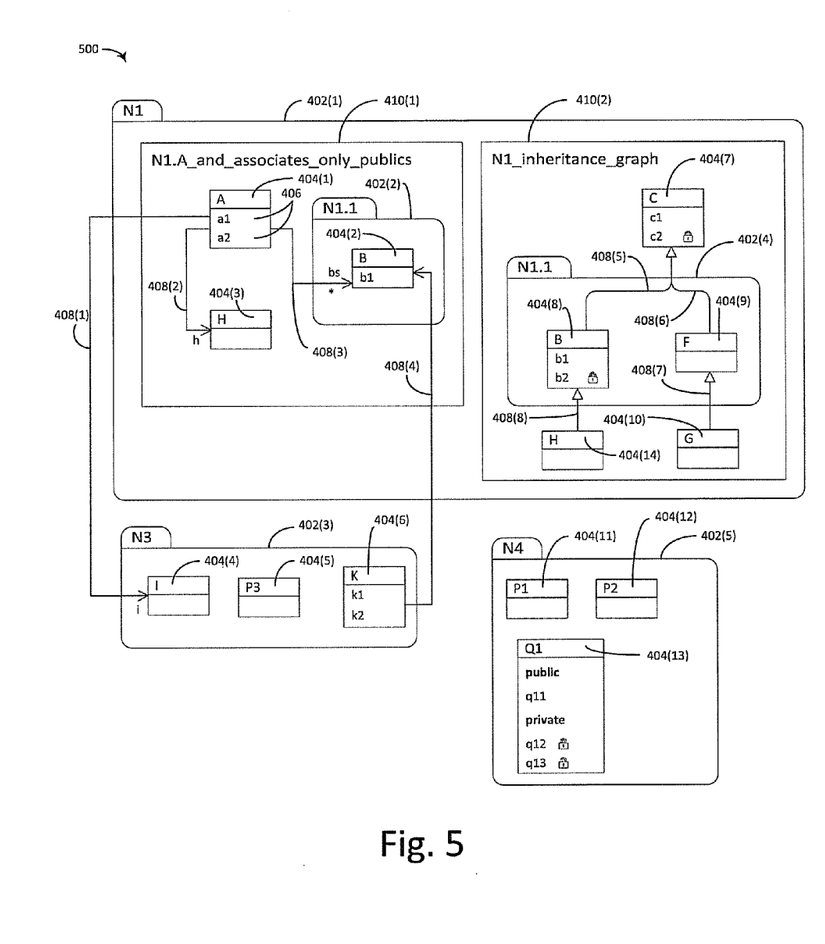
FIG. 5 is a diagram illustrating the nested graph shown in FIG. 4 after refresh to reflect changes in underlying data according to one embodiment.

FIG. 5 is a diagram illustrating the nested graph shown in FIG. 4 after refresh to reflect changes in underlying data according to one embodiment. The graph 500 shown in FIG. 5 is the same as the graph 400 shown in FIG. 4, except that a node 404(14) (i.e., class H) and an inheritance link 408(8) have been added to the graph 500 in FIG. 5. The graph 500 in FIG. 5 represents a refreshed version of the graph 400 shown in FIG. 4 after changing the code so that class H inherits from class B.

As described above with respect to FIG. 2, D2GM 212 generates a graph 204 (such as those shown in FIGS. 3-5) based on GFD 214. GFD 214 according to one embodiment is a specification in terms of nested groups, where for each group, a query is defined that determines the contents of that group. The following Pseudo Code Example I provides one example for implementing GFD 214 to produce the graphs shown in FIG. 4:

Pseudo Code Example I

Namespace* group query=N1
    Class* group name="N1.A_and_associates_only_publics"
    query=Class N1.A, direct associates of A in N1 and sub-
    namespaces of N1
        Member* group query=public members
        show association links sourced/targeted on class A
    Class* group name="N1_inheritance_graph" query=Classes in N1
    and sub-namespaces, which have an inheritance relationship with
    another class in that set
        // no need to specify that all members will be shown for each
        class, as this is the default if no subgroups are defined
        For each class, show inheritance links sourced/target on the

```
            class, linking to first shape found representing the element at
               end
    Namespace* group query=All namespaces with 'N' in the name, except
    N1 and N5
            Class* group query=Classes which have associates in N1 and
               subnamespaces
               For each class, show association links to the associates in N1
                  and subnamespaces, linking to first shape found representing
                  the element at the other end
    Namespace* group query=Namespaces in this set numbered 3 and
    upwards, except N5
            Class* group query=Classes whose name is of the form P*
               // must specify a group with nothing in it, if we don't want any
                  members to be shown; the default is that no subgroups means all
                  contents will be shown
               Member* group query=no members
            Class* group query=Classes whose name is of the form Q*
               Member* group name="public" query=public members of the
                  class
               Member* group name="private" query=private members in
                  this class
```

The pseudo code "Namespace*group query=N1" in Pseudo Code Example I defines a group whose query returns a namespace N1. The pseudo code "Namespace*" means a collection or set of things. The pseudo code "Class*group name='N1.A_and_associates_only_publics' query=Class N1.A, direct associates of class A in namespace N1 and sub-namespaces of N1" defines the group 410(1) (FIG. 4), and the query returns a set of classes to be placed within that group (i.e., class A and direct associates of A in N1 and sub-namespaces of N1). For each class returned by this query, the pseudo code "Member*group query=public members show association links sourced/targeted on class A" returns just the public members of these classes, and shows only the association links sourced/targeted on class A, and no others.

The pseudo code "Class*group name='N1_inheritance_graph' query=Classes in N1 and sub-namespaces, which have an inheritance relationship with another class in that set" in Pseudo Code Example I defines the group 410(2) (FIG. 4), and the query returns a set of classes to be placed within that group (i.e., classes in namespace N1 and sub-namespaces, which have an inheritance relationship with another class in that set). In one embodiment, it is a default configuration to display all members for each class, so for the N1_inheritance_graph group 410(2) defined by the above pseudo code, the members of the classes are not explicitly defined. For each class in the N1_inheritance_graph group 410(2), inheritance links are displayed, linking to a first shape found representing the element at the other end. It is noted that groups 410(1) and 410(2) are not naturally occurring groups, but rather are artificially defined groups that contain members obtained by queries.

The pseudo code "Namespace*group query=All namespaces with 'N' in the name, except N1 and N5" in Pseudo Code Example I returns a set of all namespaces with "N" in the name, except N1 and N5. For each such namespace returned by this pseudo code, the pseudo code "Class*group query=Classes which have associates in N1 and sub-namespaces" returns only those classes that have associates in N1 and subnamespaces. For each class returned by this query, association links to the associates in N1 and subnamespaces are shown, linking to the first shape found representing the element at the other end. Based on this pseudo code, namespace N3 is included in the graph 400, and includes nodes 403(4) and 403(6) with associated links 408(1) and 408(4), as shown in FIG. 4.

The pseudo code "Namespace*group query=Namespaces in this set numbered 3 and upwards, except N5" in Pseudo Code Example I returns a set of all namespaces that are numbered 3 or higher, but leaves out N5. For each such namespace returned by this pseudo code, the pseudo code "Class*group query=Classes whose name is of the form P*" returns only those classes that have a name of the form P*. For the classes returned by this query, no members will be shown, as indicated by the pseudo code "Member*group query=no members". Based on this pseudo code, namespace N4 is added to the graph 400, and classes P1, P2, and P3 are included (with no members), as shown in FIG. 4.

For each namespace numbered 3 or higher (except N5), the pseudo code "Class*group query=Classes whose name is of the form Q*" returns all classes having a name of the form Q*. For each such class, the pseudo code "Member*group name='public' query=public members of the class" adds a public partition to the class and adds all public members of the class to the public partition, and the pseudo code "Member*group name='private' query=private members in this class" adds a private partition to the class and adds all private members of the class to the private partition. Based on this pseudo code, class Q1 is added to namespace N4, and the public and private members of this class are shown in separate partitions, as shown in FIG. 4.

The union of the results of all of the queries appears in the graph 400. Then, within a group of namespaces, further groups define the collection of classes that are visualized. Again, these are unioned, unless the group is given an explicit name, in which case a new node is introduced for the group in the visualization, and the contents of that group are visualized independently within that node. This is how the two named sub-groups 410(1) and 410(2) in FIG. 4 were created inside the visualization of namespace N1.

Pseudo Code Example I includes further group definitions nested inside the class groups, which determine what members appear inside the classes within each group. Naming of these groups can be used to ensure that the groups are visualized explicitly (e.g., the public and private sections splitting the list of members in class Q1 in FIG. 4).

In one embodiment, if an element is in more than one sibling group, then it appears in both groups. If the siblings are not being visualized explicitly, then in one embodiment, the element is only visualized once in the parent element. The groups do not have to be siblings. The same data item may be visualized multiple times in the same diagram. The groups in which the item appears do not have to be connected.

Defining groups by queries, as shown in Pseudo Code Example I, allows one to capture the intent behind what appears on the diagram, rather than an explicit list of things at a particular point in time (although, of course, an explicit list can still be expressed as a query, such as the first namespace query in Example I which lists just N1). For example, the query specifying the group "N1_inheritance_graph" ensures that when code is changed to make class H inherit from class B, refreshing the diagram will update FIG. 4 to FIG. 5, because this query will be recalculated to now find H. In one embodiment, the differences that occur on refresh are highlighted to visually indicate to the user what has changed.

For classes, a user may also specify which links sourced/targeted on a class get shown, and which shapes they target at the other end. In FIG. 4, there are two nodes (404(2) and 404(8)) representing class B, and there is a choice to make as to which of these two shapes the link 408(4) from class K should target, or whether there should be links to both nodes. In one embodiment, the system is configured to link to the first node found. Another choice would be to link to all nodes. More sophisticated schemes may also be used in other embodiments.

Although the embodiments described above with reference to FIGS. 3-5 refer to namespaces, classes, and members, in other embodiments, the groups could return collections of any types of element, depending on the data model being visualized and the type of element the group was filtering. There may be groups at the same level returning collections of different types of elements, provided the type of element being filtered by the group definitions can have those types as content. For example, groups filtering a namespace could return collections of interfaces and enumerations as well as classes.

The pseudo code given in Pseudo Code Example I can be translated into code, or expressed in XML or some other way that a code framework interprets. When doing that, the queries currently expressed in English would be formalized.

Although Pseudo Code Example I is being used to express the contents of a diagram, similar specifications could be used to define the filtering of a data model expressed as a nested graph. For example, a graph of work items, e.g., in Visual Studio Team Foundation Server, is such a graph, where parent child links between work items provide the natural hierarchy of groups, and other links between nodes form the rest of the graph. In that case, such a specification would provide a rich way of returning a subgraph of the nested groups with additional logical groupings inserted to help further organize the data.

Figure 6:
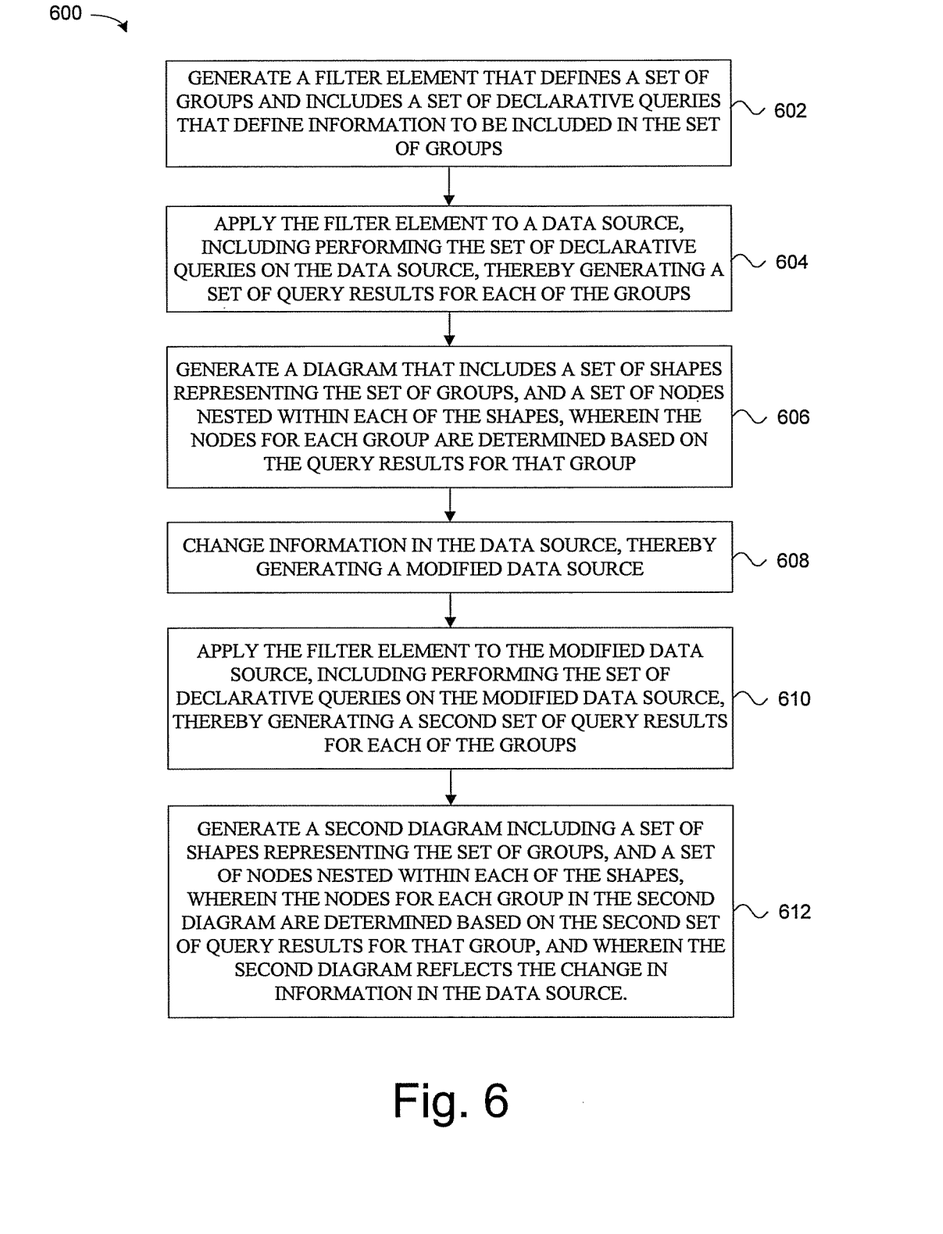
FIG. 6 is a flow diagram illustrating a method for providing a query-based diagrammatic presentation of data according to one embodiment.

FIG. 6 is a flow diagram illustrating a method 600 for providing a query-based diagrammatic presentation of data according to one embodiment. In one embodiment, system 200 (FIG. 2) is configured to perform method 600. At 602 in method 600, a filter element is generated that defines a set of groups and includes a set of declarative queries that define information to be included in the set of groups. At 604, the filter element is applied to a data source, which includes performing the set of declarative queries on the data source, thereby generating a set of query results for each of the groups. At 606, a diagram is generated that includes a set of shapes representing the set of groups, and a set of nodes nested within each of the shapes, wherein the nodes for each group are determined based on the query results for that group. At 608, information in the data source is changed, thereby generating a modified data source. At 610, the filter element is applied to the modified data source, which includes performing the set of declarative queries on the modified data source, thereby generating a second set of query results for each of the groups. At 612, a second diagram is generated, which includes a set of shapes representing the set of groups, and a set of nodes nested within each of the shapes, wherein the nodes for each group in the second diagram are determined based on the second set of query results for that group, and wherein the second diagram reflects the change in information in the data source. In one embodiment of method 600, the applying the filter element (604) and the generating a diagram (606) are performed by at least one processor.

The generated diagram in method 600 according to one embodiment further includes a set of members within each of the nodes and a set of links interconnecting related ones of the nodes, and the set of members for each node is determined based on the query results. In one embodiment, at least one of the nodes appears at least two times in the diagram. In one embodiment, the data source in method 600 comprises a set of computer code, the groups comprise namespaces identified in the computer code, and the nodes comprise classes identified in the computer code. In one embodiment, the filter element in method 600 comprises an eXtensible Markup Language (XML) document. In another embodiment, the filter element comprises computer code. In one embodiment, the set of groups in method 600 includes at least one group nested within at least one other group.

Another embodiment is directed to a system (e.g., system 200) for providing a query-based diagrammatic presentation of data. The system includes a filter element (e.g., GFD 214) that defines a set of groups and includes a set of declarative queries that define information to be included in the set of groups. The system includes an interpreter (e.g., GFDI 206) configured to apply the filter element to a data source, including performing the set of declarative queries on the data source to generate a set of query results for each of the groups. The system further includes a graph generator (e.g., D2GM 212) configured to generate a diagram (e.g., graph 204) including a set of shapes representing the set of groups, a set of nodes nested within each of the shapes, a set of members within each of the nodes, and a set of links interconnecting related ones of the nodes, wherein the nodes and the members included in each group are determined based on the query results for that group.

What is claimed is:

1. A method for providing a query-based diagrammatic presentation of data, the method comprising:
generating a filter element that defines a set of groups and includes a set of declarative queries that define information to be included in the set of groups;
applying the filter element to a data source, including performing the set of declarative queries on the data source, thereby generating a set of query results for each of the groups;
generating a diagram including a set of shapes representing the set of groups, and a set of nodes nested completely inside of each of the shapes, wherein the nodes for each respective group are determined based on the query results for the groups, respectively; and
wherein the applying the filter element and the generating a diagram are performed by at least one computer processor.

2. The method of claim 1, wherein the generated diagram further includes a set of members within each of the nodes, and wherein the set of members for each node is determined based on the query results.

3. The method of claim 2, wherein the generated diagram further includes a set of links interconnecting related ones of the nodes, and wherein at least one of the nodes appears at least two times in the diagram.

4. The method of claim 1, wherein the data source comprises a set of computer code.

5. The method of claim 4, wherein the groups comprise namespaces identified in the computer code and the nodes comprise classes identified in the computer code.

6. The method of claim 1, wherein the filter element comprises an eXtensible Markup Language (XML) document.

7. The method of claim 1, wherein the filter element comprises computer code.

8. The method of claim 1, and further comprising:
changing information in the data source, thereby generating a modified data source; and
applying the filter element to the modified data source, including performing the set of declarative queries on the modified data source, thereby generating a second set of query results for each of the groups.

9. The method of claim 8, and further comprising:
generating a second diagram including a set of shapes representing the set of groups, and a set of nodes nested within each of the shapes, wherein the nodes for each group in the second diagram are determined based on the second set of query results for that group, and wherein the second diagram reflects the change in information in the data source.

10. The method of claim 1, wherein the set of groups includes at least one group nested within at least one other group.

11. A computer-readable storage medium storing computer-executable instructions that when executed by at least one processor cause the at least one processor to perform a method for providing a query-based diagrammatic presentation of data, the method comprising:
 generating a filter element that defines a set of groups and includes a set of declarative queries that define information to be included in the set of groups;
 applying the filter element to a data source, including performing the set of declarative queries on the data source, thereby generating a set of query results for each of the groups; and
 generating a diagram including a set of shapes representing the set of groups, and a set of nodes nested within each of the shapes, wherein the nodes for each respective group are determined based on the query results for the groups, respectively.

12. The computer-readable storage medium of claim 11, wherein the generated diagram further includes a set of members within each of the nodes, and wherein the set of members for each node is determined based on the query results.

13. The computer-readable storage medium of claim 12, wherein the generated diagram further includes a set of links interconnecting related ones of the nodes.

14. The computer-readable storage medium of claim 11, wherein the data source comprises a set of computer code.

15. The computer-readable storage medium of claim 14, wherein the groups comprise namespaces identified in the computer code and the nodes comprise classes identified in the computer code.

16. The computer-readable storage medium of claim 11, wherein the filter element comprises an eXtensible Markup Language (XML) document.

17. The computer-readable storage medium of claim 11, wherein the filter element comprises computer code.

18. The computer-readable storage medium of claim 11, wherein the method further comprises:
 changing information in the data source, thereby generating a modified data source; and
 applying the filter element to the modified data source, including performing the set of declarative queries on the modified data source, thereby generating a second set of query results for each of the groups.

19. The computer-readable storage medium of claim 18, wherein the method further comprises:
 generating a second diagram including a set of shapes representing the set of groups, and a set of nodes nested within each of the shapes, wherein the nodes for each group in the second diagram are determined based on the second set of query results for that group, and wherein the second diagram reflects the change in information in the data source.

20. A system for providing a query-based diagrammatic presentation of data, the system comprising:
 a filter element that defines a set of groups and includes a set of declarative queries that define information to be included in the set of groups;
 an interpreter configured to apply the filter element to a data source, including performing the set of declarative queries on the data source to generate a set of query results for each of the groups; and
 a graph generator configured to generate a diagram including a set of shapes representing the set of groups, a set of nodes nested within each of the shapes, a set of members within each of the nodes, and a set of links interconnecting related ones of the nodes, wherein the nodes and the members included in each respective group are determined based on the query results for the groups, respectively, and wherein the filter element, the interpreter, and the graph generator are implemented with at least one computer processor.

* * * * *